(12) United States Patent
Mangione

(10) Patent No.: US 6,363,464 B1
(45) Date of Patent: Mar. 26, 2002

(54) REDUNDANT PROCESSOR CONTROLLED SYSTEM

(75) Inventor: Michael T. Mangione, Point Pleasant, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/414,915

(22) Filed: Oct. 8, 1999

(51) Int. Cl.[7] .............................................. G06F 12/00
(52) U.S. Cl. ........................... 711/167; 710/53; 710/57; 714/11
(58) Field of Search ....................... 710/53, 57; 714/11; 711/167, 154

(56) References Cited

U.S. PATENT DOCUMENTS

| 5,434,998 A | * | 7/1995 | Akai et al. | 710/57 |
| 5,473,756 A | * | 12/1995 | Traylor | 710/57 |
| 5,838,894 A | * | 11/1998 | Horst | 710/53 |

* cited by examiner

Primary Examiner—Matthew Kim
Assistant Examiner—C. P. Chace
(74) Attorney, Agent, or Firm—Keith D. Nowak

(57) ABSTRACT

The operation of a shadow processor for a system having redundant controllers is arranged so that it receives a FIFO fill indicator from another shadow processor associated with that one of the controllers that is in a standby mode, and, if the value of the indicator reaches a predetermined value, then the shadow processor throttles the data writing activity of the active controller for an amount of time sufficient to allow the other shadow processor time to unload the FIFO below a particular fill level.

10 Claims, 4 Drawing Sheets

300

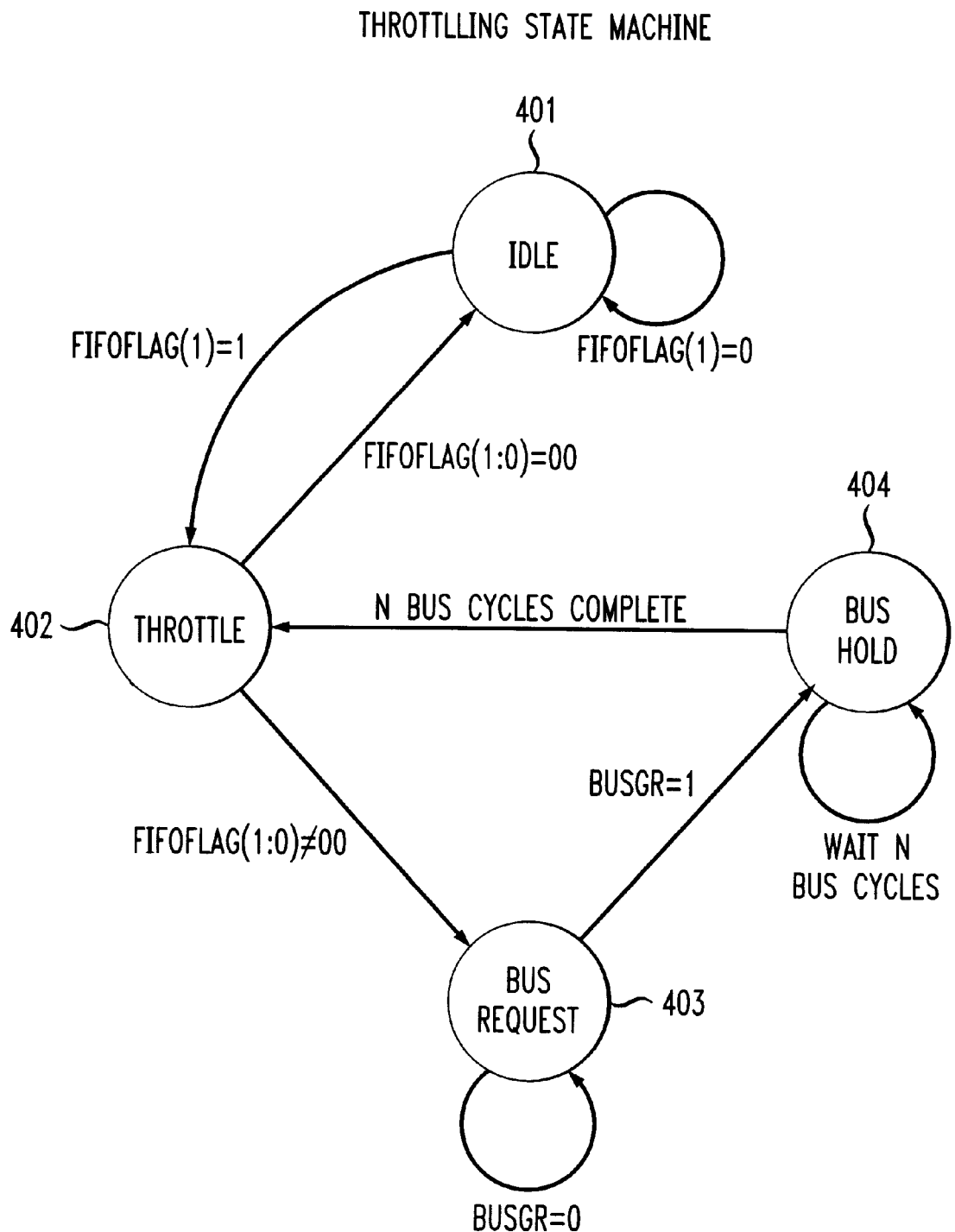

REDUNDANT PROCESSOR CONTROLLED SYSTEM

FIELD OF THE INVENTION

The invention relates to systems employing active and standby processors, and more particularly relates to the writing of data from the active processor to the standby processor so that the latter processor may track accurately the activity of the former processor.

BACKGROUND OF THE INVENTION

Many different systems, e.g., computer processing systems, communication systems, etc., employ redundant system processors for reliability purposes. Typically, the processors are respectively designated the active and standby processors, in which the active processor controls the operation of the system and the standby processor monitors the health of the active processor. The standby processor assumes an active state whenever diagnostic processes indicate that the active processor is faulty. To help ensure that its transition from the standby state to the active state does not impact the system, the standby processor continually tracks the activity of the active processor. The standby processor does this by monitoring the writing of certain data pertaining to the system in memory, as is shown in FIG. 1.

In particular, operational system 300 includes, inter alia, the underlying system 250 whose operation is controlled by redundant controllers (processors) 100 and 200. Each of the controllers include, inter alia, a processor (105, 205), memory (110, 210) and shadow processor (120, 220). Assume that controllers 100 are respectively designated as active and standby. In the active state, shadow processor 120 monitors the data that system processor 105 writes into memory 110 via bus 115. If shadow processor 120 finds that data is being written into one of a predetermined group of memory 110 locations, then shadow processor 120 passes the write address and data to shadow processor 220 via path 121. The write address and data is loaded into a conventional FIFO within processor 220. Processor 220 unloads such data from its FIFO and stores it via bus 215 in a memory 210 location specified by the address accompanying the data. To do so, processor 220 must contend with system processor 205 for access to bus 215. If processor 205 is also contending for bus 215, and the active system processor 105 is storing an appreciable amount of data in the aforementioned group of memory 110 locations, then it is possible that shadow processor 220 might not be able to access bus 215 frequently enough to keep pace with the loading of shadow data in its FIFO. Consequently, data may be lost when the FIFO overflows, which would seriously impact the ability of standby controller 200 to track active controller 100.

SUMMARY OF THE INVENTION

I address the above problem and advance the relevant art by controlling the speed at which the active processor is writing data into the monitored memory locations whenever the number of memory locations containing unloaded data in the FIFO of the standby shadow processor reaches a predetermined level. In accordance with an aspect of the invention, the active processor monitors the number of locations of the standby FIFO that are filled and invokes such control when it detects that that number has reached the aforementioned predetermined level. In accordance with another aspect of the invention, the active shadow processor exercises such control by contending for access to the memory access bus and "holding" onto the bus for a brief period of time sufficient to allow the standby shadow processor enough time to unload its FIFO below a certain point.

These and other aspects of the claimed invention will be appreciated from the following detailed description read in conjunction with the accompanying drawings.

BRIEF DESCRIPTION OF THE DRAWING

In the drawing:

FIG. 4 is a state diagram illustrating the operation of the shadow processor of FIG. 3 in accordance with the principles of the invention.

DETAILED DESCRIPTION

Figure 1:
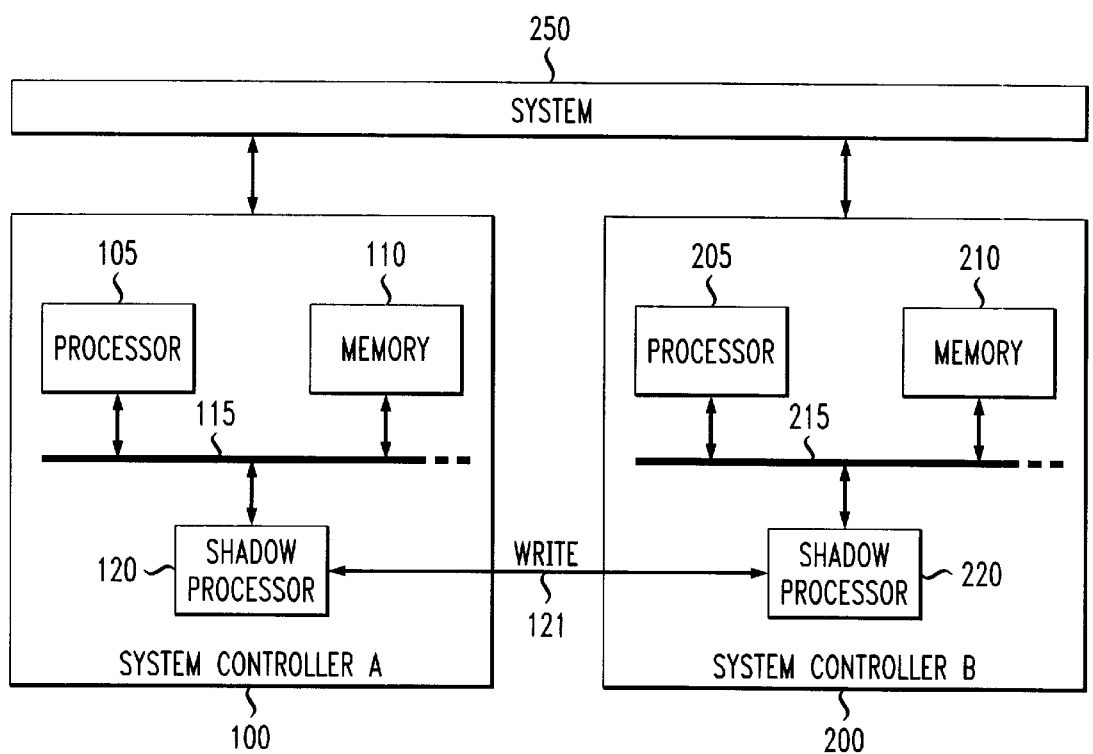
FIG. 1 is broad block diagram of a prior system employing redundant controllers each having a shadow processor.
Figure 2:
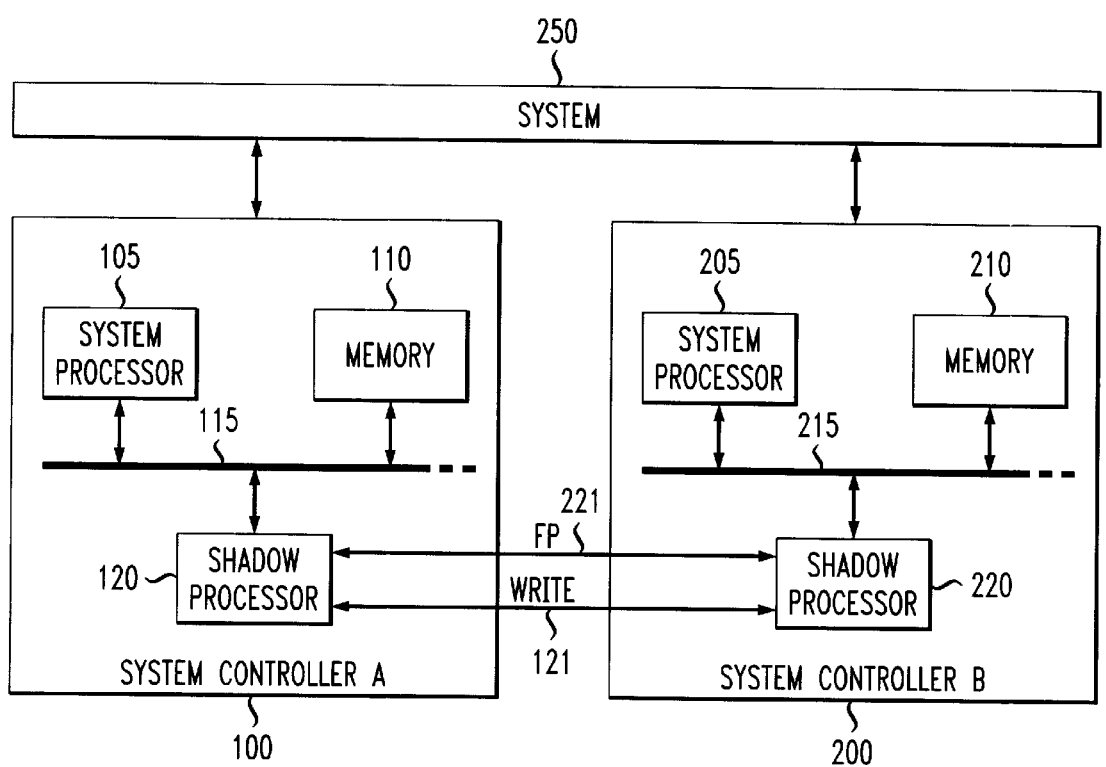
FIG. 2 is a broad block diagram of a system employing redundant controllers each having a shadow processor arranged in accordance with the principles of the invention.

Each of the shadow processors 120 and 220, FIG. 2, when in the active mode, monitor the memory writing activity of its respective active system processor (105 or 205, as the case may be) in the manner discussed above.

When such activity indicates that the active system processor, e.g., system processor 105, is writing data into one of a predetermined group(s) of memory locations, then the associated active shadow processor, e.g., shadow processor 120, writes a copy of that data and accompanying write address in the input FIFO of the standby shadow processor, e.g., shadow processor 220, via path 121, as mentioned above. If the level of such activity is high—meaning that the active system processor is writing a large amount data into the group of memory location—then it is possible that the standby shadow processor might not be able to unload its input FIFO as fast as the active shadow processor is supplying data to that FIFO. In that event, the latter FIFO could overflow, thereby interrupting the ability of the standby system processor to accurately monitor the activity of the active system processor.

I address this problem by arranging the standby shadow processor so that it supplies the fill level of its input FIFO to the active shadow processor via FP path 221. When the fill level reaches a predetermined point, e.g., a point between half-full and fill, then the active shadow processor responds thereto by contending for access to the system bus, e.g., bus 115, in accordance with a conventional bus contention scheme. When it is granted such access, then the active shadow processor holds onto to the bus for a brief period of time as a way of controlling the memory writing activity of the active system processor, all in accordance with the principles of the invention. The brief period of time is sufficient to allow the standby shadow processor to unload its FIFO below a certain fill point, e.g., to half full.

In one illustrative embodiment of the invention, the active shadow processor repeatedly accesses the system bus for a very brief period of time until the fill indicator on the FP path indicates that the number of input memory locations containing data in the FIFO of the standby shadow has decreased substantially below the aforementioned predetermined point, e.g., from three-quarters full to half full.

For the sake of simplicity and clarity, the following first discusses the operation the active shadow processor and then discusses the standby shadow processor. It is to be understood of course that any discussion relating to the active shadow processor pertains equally well to the standby shadow processor and vice-versa.

Figure 3:
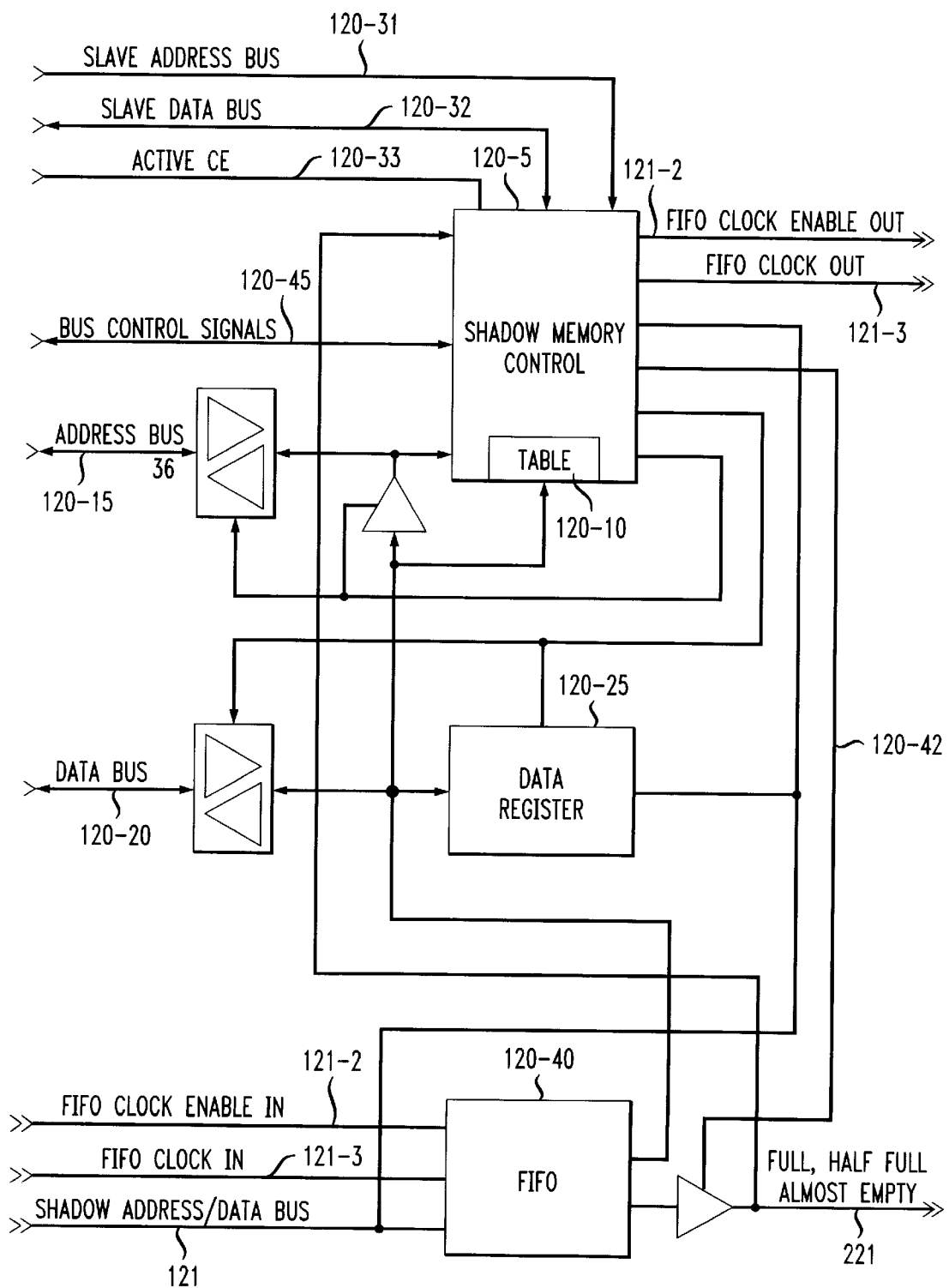
FIG. 3 is a broad block diagram of a shadow processor of FIG. 2.

Turning then to FIG. 3, shadow memory control 120-5, which may be, for example, a Field Programmable Gate Array (FPGA) 120-5, continuously monitors the data writes performed by its associated active system processor 105. Shadow memory control 120-5 does by monitoring the address portion of its associated system memory read/write bus, e.g., bus 115 of FIG. 2, via path 120-15. When the active system processor 105 places a write address on bus 115, then memory control 120-5 checks to see if that memory address is within a range(s) of addresses stored in its internal memory region table 120-10. Memory control 120-5 does this to determine if the ensuing memory write needs to be shadowed. If the address is not within the range(s) of such addresses, then memory control 120-5 disregards the active system processor memory write operation. Otherwise, shadow memory control 120-5 writes a copy of the address and associated controls signals (I.E., a FIFO clock enable on path 121-2 and FIFO clock signal on path 121-3) onto path 121. Memory control 120-5 then waits for the active processor to place the data that is to be written into the identified memory location onto the data leads of bus 115. When the active processor does so, then memory control 120-5 obtains a copy of the data via bus 120-20 connected to the data leads of bus 115. Memory control 120-5 stores the copied data in data register 120-25 and then writes it into the FIFO 120-40 of the standby shadow processor along with the accompanying write address via path 121.

(As an aside, the active processor may change the range(s) of addresses stored in table 120-10 of both the active and standby shadow processor by activating control enable 120-33, addressing each such table via slave address bus 120-31 and overwriting the data contained in the tables using slave data bus 120-32.)

The active shadow processor receives the "fill" indicator/pointer for the input FIFO of the standby shadow processor via path 221, as mentioned above. In one illustrative embodiment of the invention, path 221 is formed by, e.g., three leads. The levels of the signals on path 221 indicate when the standby FIFO is at least three-quarters full (100), at least half-full (001) and less than half-full (000). As discussed above, the active shadow processor controls the data writing activity of the active system processor as a function of the signals on path/bus 221. To say it another way, the active shadow processor throttles the activity on bus 115 responsive to the levels of the signals on path 221.

More specifically, and also referring to the state diagram shown in FIG. 4, the active shadow processor remains in a throttle idle state 401 as long as the standby FIFO is less than half full, as indicated by the 000 state on path 221 (hereinafter also referred to as the FIFO flag). The active shadow processor advances (jumps) to a throttle state 402 when the levels of the signals characterizing the FIFO flag change to 100, indicating that the standby FIFO is at least three-quarters full. The active shadow processor then advances to a bus request state 403, where it contends in a conventional manner for access to the active bus, e.g., bus 115, via bus control signal path 120-45. When it is granted such access, as represented by state 404, then the active shadow processor holds the bus for predetermined period of time characterized by a predetermined number of system clock cycles, e.g., 250 clock cycles. At the end of the latter period of time, the active shadow processor relinquishes its control of system bus 115 and returns to throttle state 402.

At state 402, the active shadow processor returns to Idle state 401 if the standby FIFO flag indicates that standby FFO is less than half full. Otherwise, the active shadow processor advances to state 403 to continue such throttling by once again contending for access to system bus 115.

Turning now to a discussion of the operation of the standby shadow processor, the active shadow processor, as mentioned above, writes data and accompanying addresses into standby FIFO 120-40. In an illustrative embodiment of the invention, FIFO 120-40 may comprise, e.g., 4000 memory locations, each location having at least 81 bits. Standby FIFO 120-40 changes the state of FIFO flag 221 accordingly when data is written into the FIFO. The standby shadow memory control 120-5 monitors the state of the FIFO flag via path 120-42. When the state of the flag goes non-empty (001), then the standby shadow memory control 120-5 unloads the data and accompanying address out of the standby FIFO 120-40. If the unloaded address falls within the range of addresses stored in table 120-10, then the standby memory control 120-5 acquires access to bus 215 and stores the unloaded data in memory 210, FIG. 2, at a location specified by the unloaded address. The standby shadow processor does this by placing the unloaded address onto bus 120-15 and then placing the unloaded data onto bus 120-20 along with the necessary control signals. Note that standby shadow control 120-5 discards the data and accompanying address if the address is not valid.

It will thus be appreciated that, although the invention illustrated herein is described in the context of a specific illustrative embodiment, those skilled in the art will be able to devise numerous alternative arrangements which, although, not explicitly shown or described herein, nevertheless, embody the principles of the invention and are within its spirit and scope.

I claim:

1. A system having first and second controllers respectively operating at a given point in time as active and standby controllers, each of said first and second controllers comprising a system processor, FIFO memory associated with said system processor, a shadow processor, said system processor, memory and shadow processor connected via a system bus;

wherein the system processor of the active controller writes data into its associated FIFO memory;

wherein the shadow processor of the active controller continuously monitors said data writes performed by its associated active system processor;

wherein the shadow processor writes a copy of said data and accompanying write memory address into the input FIFO of the shadow processor of the standby controller via said data pathway;

wherein the shadow processor of the standby controller supplies the fill level of its input FIFO to the shadow processor of the active controller; and when said fill level reaches a first predetermined value, the active shadow processor responds thereto by decreasing the rate at which the active processor is writing data into the system memory, until such time the standby shadow processor unloads its fill level below a second predetermined value.

2. The system of claim 1 wherein the first predetermined value indicates that the FIFO memory of the other shadow processor is at least three-quarters full and the second predetermined value indicates that the FIFO memory of the other shadow processor is less than half full.

3. The system of claim 1 further comprising
a bus for writing data into the system memory, and wherein the control apparatus performs such decreasing by accessing said bus for a predetermined period of time and repeating such accessing until the number indicator reaches said second predetermined value.

4. The system of claim 1 wherein the control apparatus includes apparatus for unloading the data and system memory address from the associated FIFO and, if the system memory address is within a predetermined range of such addresses, for then storing the data in another system memory at a location specified by the system memory address, otherwise discarding the data.

5. A shadow processor for a system having redundant controllers, in which each of said redundant controllers having a shadow processor and being operative for writing system data into respective system memories, said shadow controller comprising
means for receiving an indicator from another shadow processor associated with that one of the controllers that is in a standby mode; and
means, responsive to the indicator reaching a first predetermined value, for controlling the data writing activity of the other one of the controllers and continuing such control until the value of the indicator decreases to a second predetermined value.

6. A shadow processor for a system having redundant controllers, each of said redundant controllers having a shadow processor and being operative for writing system data into respective system memories, said shadow controller comprising
a FIFO memory of a predetermined number of memory locations, in which each said FIFO memory includes an indicator to indicate the number of such memory locations that contain data;
means, for receiving the indicator from another shadow processor associated with that one of the controllers that is in a standby mode, and control apparatus operative when the respective one of said redundant controllers is active and is writing data into at least one of a predetermined range of memory locations and passing the data and memory address of the data into the FIFO memory of the other shadow processor, and for controlling the rate at which the active controller is writing data into the system memory as a function of the value of said indicator.

7. The shadow processor of claim 6 wherein said system includes
a bus for writing data into the system memory, and wherein the control apparatus performs such controlling by decreasing the rate at which the active one of the controllers accesses the system memory via said bus.

8. The shadow processor of claim 6 wherein the FIFO memory includes apparatus to indicate by way of said indicator the number of FIFO memory locations that contain data.

9. A method of operating a shadow processor comprising the steps of
(a) remaining in an idle state as long as a FIFO fill indicator supplied by another shadow processor is below a first predetermined value;
(b) contending for access to a system bus when the FIFO fill indicator reaches or exceeds the first predetermined value, and holding onto to the system bus for a predetermined period of time and then relinquishing such access;
(c) repeating step (b) until the FIFO fill indicator decreases to a second predetermined value, and then returning to step (a).

10. A method of operating a shadow processor within a system having redundant controllers, in which each of the redundant controllers is operative for writing system data into respective system memories, said method comprising the steps of,
receiving an indicator from another shadow processor associated with that one of the controllers that is in a standby mode; and
responsive to the indicator reaching a first predetermined value, controlling the data writing activity of the other one of the controllers and continuing such control until the value of the indicator decreases to a second predetermined value.

* * * * *